United States Patent [19]

Boeckh et al.

[11] Patent Number: 5,652,283

[45] Date of Patent: Jul. 29, 1997

[54] PREPARATION OF FINELY DIVIDED MIXTURES OF AMPHIPHILIC POLYMERS AND POLYCARBOXYLATES AND USE THEREOF

[75] Inventors: Dieter Boeckh, Limburgerhof; Hans-Ulrich Jäger, Neustadt; Alexander Kud, Eppelsheim; Wolfgang Trieselt, Karlsruhe; Wolfgang Bühler, Hochenheim, all of Germany

[73] Assignee: BASF Aktiengesellschaft, Ludwigshafen, Germany

[21] Appl. No.: 598,704

[22] Filed: Feb. 8, 1996

[30] Foreign Application Priority Data

Feb. 25, 1995 [DE] Germany .................. 195 06 634.0

[51] Int. Cl.$^6$ .............. C08L 33/02; C08L 67/04; C08L 77/00; C08L 67/02

[52] U.S. Cl. .............. 524/47; 525/63; 525/173; 525/176; 525/425; 525/437; 525/445; 510/340

[58] Field of Search .................. 525/173, 176, 525/445, 437, 425, 63; 524/47; 252/174.24, 174.21

[56] References Cited

U.S. PATENT DOCUMENTS

| | | | |
|---|---|---|---|
| 4,569,772 | 2/1986 | Ciallella | 252/8.6 |
| 5,142,020 | 8/1992 | Alexander et al. | |

FOREIGN PATENT DOCUMENTS

| | | |
|---|---|---|
| 0 185 427 | 6/1986 | European Pat. Off. . |
| 0 241 984 | 10/1987 | European Pat. Off. . |
| 0 241 985 | 10/1987 | European Pat. Off. . |
| 0 272 033 | 6/1988 | European Pat. Off. . |
| 44 03 866 | 8/1995 | Germany . |

OTHER PUBLICATIONS

Polymer Bulletin, vol. 17, pp. 499–506, 1987, Anna Edelman, et al., "Synthesis and NMR Study Of Some Aliphatic Block and Branched α,ω-Dihydroxy Polyesterethers".

*Primary Examiner*—Patricia A. Short
*Attorney, Agent, or Firm*—Oblon, Spivak, McClelland, Maier & Neustadt, P.C.

[57] ABSTRACT

A process for preparing finely divided mixtures of amphiphilic polymers and polycarboxylates, which comprises mixing (a) aqueous dispersions or colloidal aqueous solutions with at least one amphiphilic polymer, and (b) an aqueous solution of a polycarboxylate in a weight ratio of (a):(b) of from 1:1 to 1:20, each based on the solids, or dispersing at least one amphiphilic polymer in an aqueous solution of a polycarboxylate, and spray-drying the dispersions thus obtainable to form finely divided polymer mixtures, use of the finely divided polymer mixtures as ingredient of detergent and as laundry aftertreatment, and finely divided polymer mixtures having a particle size from 20 μm to 3 mm prepared by the above-indicated process.

22 Claims, No Drawings

PREPARATION OF FINELY DIVIDED MIXTURES OF AMPHIPHILIC POLYMERS AND POLYCARBOXYLATES AND USE THEREOF

The present invention relates to a process for preparing finely divided mixtures of amphiphilic polymers and polycarboxylates and to the use of the mixtures as ingredient of detergents.

Amphiphilic polymers with very different properties in the solid state are known. They can be crystalline, partly crystalline, glassy or, above the glass transition temperature, elastomeric. Amphiphilic polymers with a high degree of crystallinity are prepared for example by condensation of terephthalic acid or dimethyl terephthalate with ethylene glycol and polyethylene glycol (cf. U.S. Pat. No. 3,557,039). Such polyesters are used as detergent additive. In the washing of textile material they inhibit the redeposition of soil on the textile material; cf. GB-A-1 154 730.

EP Applications 185 427, 241 984, 241 985 and 272 033 disclose polyester condensates of polybasic aromatic carboxylic acids with dihydric alcohols and unilaterally $C_1$–$C_4$-alkyl-capped polyethers, which promote soil release from polyester fabrics. These polyesters have hydrophilic end groups which, in the applications mentioned, are said to be a prerequisite for the soil release properties of the polyesters, so that these polymers are also referred to as soil release polymers.

Amphiphilic polyesters of aliphatic polybasic carboxylic acids and/or monohydroxymonocarboxylic acids with polyethylene glycol are described for example in Polymer Bulletin 17 (1987), 499–506.

U.S. Pat. No. 5,142,020 disclose amphiphilic polyesters obtainable by condensation of (a) carboxylic acids having at least 2 carboxyl groups, their esters, anhydrides or mixtures, (b) at least dihydric alcohols and/or addition products of from 1 to 5 mol of at least one alkylene oxide having 2 or 3 carbon atoms with 1 mol of an at least dihydric alcohol or mixtures, and (c) water-soluble addition products of from 5 to 80 mol of at least one alkylene oxide with 1 mol of $C_8$–$C_{29}$-alcohols, $C_8$–$C_{18}$-alkylphenols or $C_8$–$C_{18}$-alkylamines in a molar ratio of (a):(b):(c) of 100:(from 25 to 2500):(from 5 to 110) at temperatures of at least 120° C. to weight average molecular weights of from 2000 to 50000. The polyesters are used as grayness-inhibiting and soil-releasing ingredient of pulverulent and liquid detergents.

DE Application P 44 03 866.6, unpublished at the priority date of the present invention, discloses amphiphilic polymers comprising polyesters containing blocks of (1) ester units of polyalkylene glycols having a molecular mass of from 500 to 7500 and aliphatic dicarboxylic acids and/or monohydroxycarboxylic acids, and (2) ester units of aromatic dicarboxylic acids and polyhydric alcohols and having molecular masses $M_w$ from 4000 to 25000, and preferably containing the ester units (1) and (2) in a weight ratio of from 5:1 to 1:2.

The above-described polyesters are usually incorporated into the detergent formulations in the form of aqueous solutions or dispersions. However, this use form is in many cases impractical or even unsuitable. For example, most dispersions of such amphiphilic polyesters cannot be processed in concentrations above 25% at room temperature since the viscosity is too high. In addition, processing aqueous dispersions of amphiphilic polyesters under alkaline conditions at the customary higher processing temperatures is usually likely to result in a hydrolysis and hence reduced effectiveness of the polyesters. On the other hand, it is not possible to prepare free flowing powders or granules from aqueous dispersions of amphiphilic polyesters by spray drying.

Prior artisans have therefore ground mixtures of amphiphilic polyesters and extrudable organic solids together in solid form, extruded the mixture, and formed the extrudate for example into granules; cf. DE-A-22 49 812. U.S. Pat. No. 4,569,772 discloses mixtures of amphiphilic polyesters and polycarboxylates, obtainable by mixing molten polyesters with a polyacrylate, cooling the mixture and comminuting the resulting solid product to the desired particle size by cryogenic methods. This cryogenic comminution of the material is carried out at temperatures below 0° C., sometimes even below −50° C. The coolant recommended for this purpose is liquid nitrogen or solid carbon dioxide (dry ice). However, the finely divided mixtures thus obtainable disperse only badly in water.

It is an object of the present invention to provide a process for preparing finely divided mixtures of amphiphilic polymers and polycarboxylates that are free-flowing at room temperature, storage-stable and readily dispersible in water.

We have found that this object is achieved according to the present invention by a process for preparing finely divided mixtures of amphiphilic polymers and polycarboxylates, which comprises mixing (a) aqueous dispersions or colloidal aqueous solutions with at least one amphiphilic polymer, and (b) an aqueous solution of a polycarboxylate in a weight ratio of (a):(b) of from 1:1 to 1:20, each based on the solids, or dispersing at least one amphiphilic polymer in an aqueous solution of a polycarboxylate, and spray-drying the dispersions thus obtainable to form a finely divided polymer mixture. The object is also achieved by finely divided polymer mixtures having a particle size of from 20 µm to 3 mm, prepared by the above-described process.

The present invention also provides for the use of the finely divided mixtures as ingredient of detergents and as laundry after-treatment. The amphiphilic polymers are mainly polyesters. Their molecular mass $M_w$ is for example from 4000 to 60,000 and as hydrophilic units they contain polyethylene glycol, block copolymers of ethylene oxide and propylene oxide and/or butylene oxide having molecular masses $M_n$ from 500 to 8000 and/or sulfo-containing monobasic or polybasic carboxylic acids and as hydrophobic units condensed blocks of aromatic polybasic carboxylic acids, optionally in combination with aliphatic polybasic carboxylic acids and $C_2$–$C_4$-alkylene glycols and/or trihydric or more highly hydric alcohols.

Amphiphilic polyesters of the type mentioned are known from the references cited at the beginning; cf. U.S. Pat. No. 3,557,039, EP-A-0 185 427, EP-A-0 241 984, EP-A-0 241 985, EP-A-0 272 033 and U.S. Pat. No. 5,142,020. A preferred class of amphiphilic polymers are polyesters containing units of (1) ethylene terephthalate, and (2) polyoxyethylene terephthalate of polyethylene glycols having molecular masses $M_n$ from 1000 to 7500 in a weight ratio of (1):(2) of from 1:1 to 1:25.

A further class of suitable amphiphilic polymers are polyesters known from U.S. Pat. No. 5,142,020, which are obtainable by condensation of (1) carboxylic acids having at least 2 carboxyl groups, their esters, anhydrides or mixtures, (2) at least dihydric alcohols and/or addition products of from 1 to 5 mol of at least one alkylene oxide having 2 or 3 carbon atoms with 1 mol of an at least dihydric alcohol or mixtures, and (3) water-soluble addition products of from 5 to 80 mol of at least one alkylene oxide with 1 mol of $C_8$–$C_{24}$-alcohols, $C_8$–$C_{18}$-alkylphenols or $C_8$–$C_{24}$-alkylamines in a molar ratio of (1):(2):(3) of 100:(from 25 to 2500):(from 5 to 110) at temperatures of at least 120° C. to molecular masses $M_W$ from 4000 to 50,000.

A further class of preferable amphiphilic polymers are polyesters known from DE Application P 44 03 866.6, unpublished at the priority date of the present invention. These polyesters contain blocks of (1) ester units of polyalkylene glycols having a molecular mass of from 500 to 7500 and aliphatic dicarboxylic acids and/or monohydroxycarboxylic acids, and (2) ester units of aromatic dicarboxylic acids and polyhydric alcohols and having molecular masses $M_W$ from 4000 to 25000. The weight ratio of the ester units (1):(2) is preferably from 5:1 to 1:2. Amphiphilic polyesters of this kind are prepared for example by first using polycondensation to prepare (1) aliphatic polyesters of polyalkylene glycols having a molecular mass of from 500 to 7500 with aliphatic dicarboxylic acids and/or monohydroxycarboxylic acids and then, in the resulting aliphatic polyester, preparing (2) aromatic polyesters of aromatic dicarboxylic acids and polyhydric alcohols.

The polycondensation sequence can also be reversed, or aromatic polyesters (2) are condensed with oligomeric aliphatic polyesters (1). The weight ratio of the polyesters (1):(2) in the amphiphilic polyesters is from 5:1 to 1:2.

Suitable above-described polyesters are waxy to soft, partly crystalline at temperatures below the softening temperature, depending on the molecular mass, and have a softening temperature above 25° C., preferably above 35° C. In the present context the softening temperature of partly crystalline polymers is always to be understood as meaning the maximum DSC heat flux during heatup. DSC stands for differential scanning calorimetry and the heatup rate is 2.5° C./min. The method is described in detail by J. F. Rabek, Experimental Methods in Polymer Chemistry, John Wiley & Sons, New York, 1980, pages 549–581. The particularly preferred amphiphilic polyesters have softening temperatures above 45° C. They are obtainable for example by forming the hydrophilic part of the polyester molecule using relatively high molecular weight polyalkylene glycols, for example polyethylene glycols having molecular masses of at least 1500, preferably at least 2500. The resulting polyesters then preferably have molecular masses $M_W$ of at least 4000. Polyesters with softening temperatures above 45° C. are also preparable by using aromatic carboxylic acids with free sulfo groups such as sulfoisophthalic acid in the polycondensation and, after the polycondensation has ended, neutralizing the sulfonic acid groups with alkali metal or alkaline earth metal bases.

As well as the above-described polyesters it is also possible to use amphiphilic polymers obtainable for example by grafting acrylic esters, methacrylic esters, vinyl acetate and/or vinyl propionate onto water-soluble polyalkylene glycols. The water-soluble polyalkylene glycols have for example molecular masses $M_N$ from 2500 to 20 000, preferably 4000 to 9000, and can be optionally end group capped on one or both sides. Polymers of this kind are known for example from U.S. Pat. Nos. 4,846,995, 4,904,408, 4,846, 994 and DE-A-3 711 299.

Further suitable amphiphilic polymers are graft polymers obtainable by grafting of (1) polycondensates based on polyesters, polyesterurethanes and polyesteramides having a number average molecular weight of in each case from 2500 to 100000, with (2) from 0.2 to 10 parts by weight, based on 1 part by weight of the polycondensates, of vinyl esters, saturated $C_1$–$C_6$-carboxylic acids and/or acrylic and/or methacrylic esters of saturated, monohydric alcohols containing from 1 to 4 carbon atoms.

Such graft polymers are known for example from U.S. Pat. No. 4,849,126.

The finely divided mixtures are prepared using as component (b) an aqueous solution of a polycarboxylate or of a mixture of a plurality of polycarboxylates. Examples of suitable polycarboxylates are polymers of ethylenically unsaturated carboxylic acids. These polymers can be homopolymers of monoethylenically unsaturated carboxylic acids or else copolymers of such carboxylic acids. Suitable are for example monoethylenically unsaturated $C_3$–$C_{10}$-monocarboxylic acids or salts thereof, such as acrylic acid, methacrylic acid, dimethylacrylic acid, ethylacrylic acid, allylacetic acid and vinylacetic acid. Of this group of monomers, acrylic acid, methacrylic acid or mixtures of these two carboxylic acids are preferred. They can be used in the copolymerization in the form of the free carboxylic acids or in partially or completely neutralized form as alkali metal, ammonium or alkaline earth metal salts. The hompolymers of the monoethylenically unsaturated monocarboxylic acids and their copolymers with each other have molecular masses for example from 1000 to 500000, preferably from 2000 to 250000.

Polycarboxylates are also to be understood as meaning the homo- and copolymers of monoethylenically unsaturated $C_4$–$C_8$-dicarboxylic acids. These include for example the homopolymers of maleic acid, fumaric acid, itaconic acid, metaconic acid, citraconic acid, methylenemalonic acid and also—if known—the corresponding anhydrides which can be converted into the corresponding carboxylates by hydrolysis and neutralization. Preference among the last-mentioned polymers is given to polymaleic acid having a molecular mass of from 200 to 5000, its alkali metal or ammonium salts and in particular polymaleic acid having a molecular mass of from 300 to 2000 or its salts. Homopolymers of maleic acid are commercially available. They are prepared for example by polymerizing maleic acid in an aqueous medium in the form of the free acid or in partially or completely neutralized form using free-radical, preferably water-soluble, initiators or by polymerizing maleic anhydride in an aromatic hydrocarbon at temperatures from 60° to 200° C. in the presence of polymerization initiators, hydrolysis and at least partial neutralization of the polymers.

Suitable polycarboxylates also include the at least partially alkali metal- or ammonia-neutralized copolymers of $C_4$–$C_8$-dicarboxylic acids and monoethylenically unsaturated $C_3$–$C_{10}$-monocarboxylic acids or their alkali metal, ammonium or alkaline earth metal salts. Such copolymers can contain copolymerized units of monocarboxylic acids and dicarboxylic acids in any desired ratio. Preference is given for example to copolymers of from 10 to 40% by weight of monoethylenically unsaturated $C_4$–$C_8$-dicarboxylic acids or their alkali metal or ammonium salts and from 30 to 90% by weight of monoethylenically unsaturated $C_3$–$C_{10}$-monocarboxylic acids or their alkali metal or ammonium salts. Particular preference among this group of copolymers is given to maleic acid-acrylic acid copolymers. The preparation of such copolymers is known for example from EP-B-0 075 820. The copolymers have molecular masses for example from 5000 to 300000, preferably from 40000 to 150000.

Polycarboxylates are also to be understood as including polyamidocarboxylates which are obtainable for example by polycondensation of aspartic acid and/or glutamic acid and at least partial neutralization. Such polyamidocarboxylates are described for example in EP-A-0 454 126 for use in detergents. The molecular masses of such polycondensates range for example from 1000 to 150000 and are preferably within the range from 2000 to 100000. Homopolymers of aspartic acid and cocondensates of aspartic acid with other amino acids are known. They are prepared for example by thermal condensation of aspartic acid or mixtures of aspartic acid with at least one other amino acid. The thermal condensation takes place particularly readily in the presence of phosphoric acid. Suitable polyaminocarboxylates are described in WO-A-94/011486. The modified polyaspartic acids are obtainable for example by condensing from 1 to 99.9 mol % of aspartic acid with from 99 to 0.1 mol % of fatty acids, polybasic carboxylic acids, anhydrides of polybasic carboxylic acids, polybasic hydroxycarboxylic acids, monobasic polyhydroxycarboxylic acids, alcohols, amines, alkoxylated alcohols or amines, amino sugars, carbohydrates, sugar carboxylic acids and/or nonproteinogenic amino acids or polymerizing monoethylenically unsaturated monomers in the presence of polyaspartic acids and/or cocondensates of aspartic acid in the manner of a free-radically initiated graft polymerization. The polycondensation is preferably carried out in the presence of acids, for example hydrochloric acid, phosphoric acid, polyphosphoric acids, phosphorous acid, hypophosphorous acid, sulfuric acid, mixtures thereof or in the presence of sodium hydrogensulfate or potassium hydrogensulfate. Preference among this group of polyamidocarboxylates is given to polyaspartic acid at least partially neutralized with alkali metal bases, in particular with sodium hydroxide solution or potassium hydroxide solution.

Polyestercarboxylates are a further class of compounds which, in at least partially neutralized form, are suitable for use as mixture constituent for amphiphilic polymers. Such products are obtainable for example by esterifying polyhydroxy compounds such as starch, starch degradation products, polyvinyl alcohol, oligoglycerol, sorbitol, mannitol and/or glycerol with citric acid, isocitric acid and/or butanetetracarboxylic acid. Compounds of this kind are known; cf. EP-A-0 433 010, WO-A-93/22362 and WO-A-93/13192.

This group of polycarboxylates also includes polycondensation products of polybasic hydroxycarboxylic acids such as citric acid, isocitric acid, malic acid, tartaric acid, tartronic acid and also derivatives obtainable therefrom by modification; cf. U.S. Pat. No. 5,217,642.

Polycarboxylates are also to be understood as meaning graft polymers of monoethylenically unsaturated mono- and/or dicarboxylic acids, mono- and/or polysaccharides or polyalkylene oxides. Graft polymers with a natural substance as base are described for example in JP-A-55/155097, JP-A-61/031498 and EP-A-0 441 197. According to said JP applications, acrylic acid or methacrylic acid is polymerized in the presence of mono- or polysaccharides to form graft polymers. According to EP-A-0 441 197, monomer mixtures of (A) monoethylenically unsaturated $C_3$–$C_{10}$-carboxylic acids, their anhydrides, alkali metal, ammonium or alkaline earth metal salts are polymerized in the presence of (B) mono-, oligo- or polysaccharides, which may have been oxidatively, hydrolytically or enzymatically degraded, chemically modified mono-, oligo- and polysaccharides or mixtures thereof in a weight ratio of (A):(B) of (95–20):(5–80). Of the monoethylenically unsaturated carboxylic acids, preference is given to acrylic acid, methacrylic acid, maleic acid or mixtures thereof. Particular preference is given here to graft copolymers which are obtainable by polymerization of acrylic acid and maleic acid in the presence of mono- or polysaccharides. The grafting base used preferably comprises hydrogenation products of starch hydrolyzates, such as sorbitol and mannitol, maltitol and hydrogenated glucose syrup. The graft polymers have molecular masses from 5000 to 150000, preferably from 10000 to 100000.

Also suitable for use as grafting base are polyalkyene oxides having molecular masses from 200 to 20,000. Further suitable polycarboxylates are citric acid and oxidized starches, preferably monooxidized starch as described for example in WO-A-93/08251.

Preferred polycarboxylates are copolymers of from 80 to 25% by weight of maleic acid and from 20 to 75% by weight of acrylic acid, terpolymers of from 5 to 60% by weight of maleic acid, from 5 to 70% by weight of acrylic acid and from 20 to 60% by weight of vinyl acetate, oligomaleic acid, polyaspartic acid and citric acid. The polycarboxylates are used in at least partially neutralized form or in completely neutralized form. The degree of neutralization is at least 20% and is usually within the range from 40 to 100%. The at least partially neutralized polycarboxylates are unmeltable or melt with decomposition. The finely divided mixtures of the present invention can be prepared for example by initially charging an aqueous dispersion or colloidal aqueous solution of at least one amphiphilic polymer and metering in the aqueous solution of a polycarboxylate with thorough mixing. However, it is also possible to charge a solution of the polycarboxylate initially and to meter in an aqueous dispersion or colloidal aqueous solution of at least one amphiphilic polymer. The aqueous dispersions or colloidal aqueous solutions of amphiphilic polymers and aqueous solutions of carboxylates each have solids contents for example from 20 to 60, preferably from 25 to 45, % by weight. The pH of the aqueous dispersions of amphiphilic polymers can be for example from 2.5 to 10 and is customarily within the range from 3 to 7, preferably from 3 to 6.5. The temperature at which components a) and b) are mixed with each other can be for example from 5° to 100° C. and is preferably within the range from 20° to 60° C. Mixing of components a) and b) can in some cases be facilitated by effecting the mixing in the presence of compounds which stabilize the mixture. Such compounds c) include for example surface-active substances such as anionic and nonionic surfactants, for example $C_6$–$C_{25}$-alcohol sulfates, $C_6$–$C_{25}$-alcohol sulfonates, $C_4$–$C_{18}$-alkyl sulfonates, alkoxylated $C_6$–$C_{25}$-alcohols or alkoxylated $C_4$–$C_{18}$-alkylphenols, in which case the level of cocondensed ethylene oxide in the alkoxylated products is from 3 to 25 mol/mol of alcohol or phenol. It is also possible to use alkoxylation products in which up to 30% of the ethylene oxide is replaced by propylene oxide and/or butylene oxide. Similarly, the sulfates or sulfonates obtainable therefrom are suitable for use as surface-active compounds.

The mixing of components a) and b) is facilitated by protective colloids; that is, such mixtures are stabilized by the use of protective colloids. Suitable protective colloids include for example starches, degradation products of starch and cellulose and also esterification-, etherification- or oxidation-modified starches and celluloses, such as maltodextrins, carboxymethyl-starch, carboxymethylcellulose, methylcellulose and hydroxypropylcellulose. As well as the abovementioned natural protective colloids and the derivatives obtainable therefrom by reaction, synthetic protective colloids are suitable for use as stabilizers for the mixtures of components a) and b). Suitable synthetic protective colloids include for example polyvinylpyrrolidones, polyvinyl alcohols and polyalkyl vinyl ethers. In the preparation of the mixtures of the present invention, the stabilizing compounds c) can be initially charged to the reactor together with component a) or b) or be metered into the initial charge together with one of the components. Of course, it is also possible for all three components to be simultaneously continuously mixed or added to an initial charge and mixed in. If compounds of component c) are used in the preparation of the aqueous dispersions, the amounts used range from 0.1 to 20% by weight, preferably from 0.25 to 10% by weight, based on the solids of components a) and b).

The mixtures are prepared using compounds a) and b) in a weight ratio of from 1:1 to 1:20, preferably from 1:1.5 to 1:6. These figures are based on the solids contents of the dispersions or solutions of the polymers.

Another way of preparing the finely divided mixtures is to disperse an amphiphilic polymer in the form of a powder or a melt in an aqueous solution of a polycarboxylate. Hereto it can be of advantage to effect the preparation of the aqueous mixture of the polymers in the presence of stabilizers c) for the aqueous dispersion.

The aqueous dispersion of components a), b) and optionally c) is made into a finely divided polymeric mixture by spray drying. Spray drying is to be understood as meaning all convection drying processes, for example spray drying or spray fluidized-bed drying whereby the dispersion to be dried is sprayed or otherwise metered onto a fluidized bed. Such drying processes give rise to powders or granules. The average particle diameter of the finely divided mixtures thus obtainable is for example from 20 μm to 3 mm and is preferably within the range from 150 μm to 1.2 mm. If desired, the finely divided mixtures can be subsequently heated to agglomerate them to larger structures.

The finely divided mixtures are used as ingredient of detergents and as laundry aftertreatment. The detergent formulations can contain for example from 0.1 to 20, preferably from 1 to 8% by weight of the finely divided mixtures. The finely divided mixtures to be used according to the present invention act as soil release polymers and as builders in the detergent.

The detergents contain at least one surfactant and optionally other customary constituents. Preference is given to using those surfactants which are biodegradable. The detergents can be pulverulent or else be present in liquid formulation. The composition of detergent and cleaner formulations can vary widely. Detergent and cleaner formulations customarily contain from 2 to 50% by weight of surfactants with or without builders. These figures apply not only to liquid but also to pulverulent detergents. Detergent and cleaner formulations which are customary in Europe, the U.S.A. and Japan are listed for example in table form in Chemical and Engn. News 67 (1989), 35. Further data about the composition of detergents can be found in Ullmann's Encyklopädie der technischen Chemie, Verlag Chemie, Weinheim, 1983, 4th edition, pages 63–160. Detergents can optionally additionally contain a bleaching agent, for example sodium perborate, which, if used, can be present in the detergent formulation in amounts up to 30% by weight. Detergents and cleaners can optionally contain further customary additives, for example complexing agents, opacifiers, optical brighteners, enzymes, perfume oils, color transfer inhibitors, grayness inhibitors and/or bleach activators.

The percentages in the Examples are by weight.

EXAMPLE 1

A 15% strength aqueous dispersion of a polyester which contained polyethylene terephthalate and polyoxyethylene terephthalate units in a molar ratio of 1.5:1.0 and had a molecular mass $M_w$ of 8000 and polyethylene oxide segments of molecular mass $M_n$ of 1500 was vigorously mixed at room temperature with a 60% strength aqueous solution of 70% acrylic acid and 30% maleic acid copolymer with a molecular mass $M_w$ of 70000 which had been partially neutralized with sodium hydroxide solution in a weight ratio of polymers of 1:3. The pH of the aqueous copolymer solution had been adjusted to 4.5 prior to the addition of the dispersion of the soil release polymer. The resulting stable dispersion was continuously stirred and sprayed into a laboratory spray dryer to obtain a fine colorless, storage-stable and readily free-flowing powder having an average particle size of 170 μm.

EXAMPLE 2

A 15% strength aqueous solution of the amphiphilic polymer described in Example 1 was mixed at room temperature with such an amount of a 22.6% strength aqueous solution of a polyaspartic acid of molecular mass $M_w$ 12 000 (the pH of the aqueous solution was 4.5) that the weight ratio of the polymers was 1:3. The resulting dispersion was continuously stirred and sprayed into a laboratory spray dryer to obtain a fine colorless, storage-stable and readily free-flowing powder which had an average particle size of 130 μm.

EXAMPLE 3

A 15% strength aqueous dispersion of the amphiphilic polymer described in Example 1 was mixed at room temperature with such an amount of a 24.7% strength aqueous solution, adjusted to pH 3.5, of an oligocitric acid which had been partially neutralized with sodium hydroxide solution, that the weight ratio of the polymers was 1:3.

The oligocitric acid was prepared as follows:

96.0 g of anhydrous citric acid were dissolved in 96 g of dioxane at 60° C., and 25.5 g of acetic anhydride were added over 1 h. After a further 30 min at 60° C. the temperature was raised to 100° C. and held at 100° C. for 1 h. The batch was then cooled back down to 60° C. The cycle of acetic anhydride addition, tempering at 60° C., heating-up to 100° C. and cooling was repeated a further three times, 25.5 g, 10.2 g and 10.2 g of acetic anhydride being added respectively. The glacial acetic acid/dioxane azeotrope was then distilled off in a rotary evaporator. Remaining acetic acid was removed by twice adding 200 g of dioxane each time and distilling off the dioxane/glacial acetic acid mixture.

The resulting stable dispersion of polyester in the aqueous solution of the oligocitric acid was laboratory spray-dried into a fine colorless storage-stable readily free-flowing powder having an average particle diameter of 190 μm.

EXAMPLE 4

A 15% strength aqueous dispersion of the amphiphilic polymer described in Example 1 and a 44.8% strength aqueous solution, adjusted to pH 4.5 with sodium hydroxide solution, of a partially neutralized oligomaleic acid of molecular mass $M_w$ 950 were mixed at room temperature in a weight ratio of 1:3, based on the polymers, and the mixture was thoroughly stirred for 15 minutes. The resulting stable dispersion was then spray-dried in a laboratory spray dryer to produce a fine, colorless storage-stable and readily free-flowing powder which had an average particle size of 120 μm.

EXAMPLE 5

A 15% strength aqueous solution of an amphiphilic polyester which contained polyethylene terephthalate and polyoxyethylene terephthalate units in a molar ratio of 4:1 and had a molecular mass $M_w$ of 10000 and polyethylene glycol blocks of molecular weight $M_n$ of 4000 and a 45% strength aqueous solution, adjusted to pH 3.5 with sodium hydroxide solution, of citric acid were mixed at room temperature in a weight ratio of 1:3, and the resulting mixture was thoroughly stirred. The resulting stable dispersion was then spray-dried in a laboratory spray dryer to obtain a fine, colorless, storage-stable and readily free-flowing powder which had an average particle size of 240 μm.

EXAMPLE 6

A 15% strength aqueous dispersion of the amphiphilic polyester described in Example 5 and a 43.2% strength solution of a terpolymer of 40 mol % of acrylic acid, 10 mol % of maleic acid and 50 mol % of vinyl acetate were mixed at room temperature in a weight ratio of 1:3, based on the polymers. The terpolymer had a molecular mass $M_W$ of 5000. The aqueous solution of the terpolymer had been adjusted to pH 3.5 with sodium hydroxide solution. The result obtained was a stable dispersion of the amphiphilic polyester in the aqueous partially neutralized terpolymer solution. This dispersion was spray-dried in a laboratory spray dryer. The result was a fine colorless, storage-stable and readily free-flowing powder which had an average particle size of 180 μm.

EXAMPLE 7

A 20% strength aqueous solution of a graft copolymer of 1.6 parts of vinyl acetate on 1 part of polyethylene oxide, molecular mass $M_n$ 6000, was heated to 50° C. and mixed with a 40% strength aqueous solution of the partially neutralized copolymer of acrylic acid and maleic acid described in Example 1 in a weight ratio of 1:10, based on the polymers. The result obtained was a stable dispersion which was free-flowing at room temperature and had a viscosity of 1800 mPas. This dispersion was subsequently spray-dried to a powder having an average particle size of 270 μm.

EXAMPLE 8

The 20% strength aqueous solution of the graft copolymer described in Example 7 was mixed at 50° C. with a 40% strength aqueous solution of the partially sodium hydroxide neutralized oligocitric acid described in Example 3, in a weight ratio of 1:10, based on the polymers. The result obtained was a solution which had a viscosity of 980 mPas and was free-flowing at room temperature. This solution was spray-dried into a powder which had an average particle size of 260 μm.

Application examples

The soil release properties of the above-described pulverulent polymer mixtures were determined in a wash test. The wash conditions are indicated in Table 1. The test fabric was prewashed three times; then its reflectance $R^1$ was determined with a Data color 2000. The test fabric was then soiled with used engine oil. After the engine oil had been on the test fabric for 24 hours the reflectance $R^2$ of the soiled test fabric was determined. The test fabric was then washed once more and the reflectance $R^3$ measured. The soil release SR in percent was calculated according to the formula $$SR=(R^3-R^2)/(R^1-R^2)*100.$$

TABLE 1

| Washing conditions | |
|---|---|
| Washer | Launder-o-meter |
| Detergent liquor | 250 ml |
| Detergent dosages | 6 g/l |
| Wash time | 30 min |
| Wash temperature | 60° C. |
| Prewash cycles | 3 |
| Test fabric | 10 g of cotton, 5 g of polyester/cotton, 5 g of polyester |
| Soiling | 0.2 g of used engine oil on polyester |

Table 2 contains the composition of the test detergents used. The detergent formulation indicated in Table 2 contained in each case such an amount of product from the indicated example that it was 1% strength in respect of soil release polyester.

TABLE 2

| Detergent formulation | |
|---|---|
| | Weight proportion in detergent [%] |
| Fatty alcohol sulfate ($C_{12}C_{14}$) | 18 |
| $C_{13}/C_{15}$ oxo alcohol + 7 ethylene oxide | 6.6 |
| Fatty acid, sodium salt | 1.8 |
| Sodium carbonate | 7.0 |
| Magnesium silicate | 0.8 |
| Sodium citrate | 12 |
| Copolymer of 70% acrylic acid and 30% maleic acid, molecular weight 60000 | 5.0 |
| Carboxymethylcellulose (60%) | 0.8 |
| Polyvinylpyrrolidone, molecular weight 40000 | 1.5 |
| Zeolite A | 45 |
| Water | balance to 100 |

The results in Table 3 show that in all cases the soil release (SR) was above 80%, as is also the case for a dispersion of the active ingredient only. This means that formulation as a spray-dried powder in a mixture with poly(sodium carboxylate)s does not affect the activity of the polymer.

TABLE 3

| Soil release | | | | | |
|---|---|---|---|---|---|
| Example | Comp. example | Product of example | Soiled | Washed | Soil release (SR) [%] |
| | 1 | | 22.5 | 45.2 | 39.2 |
| | 2 | Polyester of Example 1 (without poly-carboxylate) | 22.0 | 73.8 | 87.7 |

TABLE 3-continued

Soil release

| Example | Comp. example | Product of example | Soiled | Washed | Soil release (SR) [%] |
|---|---|---|---|---|---|
| 9 | — | 1 | 22.3 | 74.8 | 89.4 |
| 10 | — | 3 | 22.1 | 73.8 | 87.7 |
| 11 | — | 4 | 22.7 | 74.3 | 88.5 |
| 12 | — | 5 | 22.8 | 76.2 | 91.7 |
| 13 | — | 6 | 22.7 | 69.3 | 80.0 |

The dispersibility of a mixture of acrylic acid-maleic acid copolymer (sodium salt, pH 4.5) and the amphiphilic polyester of Example 1 prepared by spray drying according to the present invention was compared with the dispersibility of a mixture of the same composition prepared by the process described in Example 1 of U.S. Pat. No. 4,569,772 by stirring the mixtures for 10 min in 5% strength in water and removing the insolubles by filtration with a suction. The tests were carried out at 20° C. and 40° C. Table 4 shows the results.

TABLE 4

| | insolubles in % by weight | |
|---|---|---|
| | at 20° C. | at 40° C. |
| Mixture of Example 1 | <1% | <1% |
| Mixture of Example 1 of US-A-4 569 772 | 17% | 6% |

We claim:
1. A process for preparing finely divided mixtures of amphiphilic polymers and polycarboxylates, which process comprises mixing

(a) an aqueous dispersion or colloidal aqueous solution of at least one amphiphilic polymer, with (b) an aqueous solution of a polycarboxylate in a weight ratio of (a):(b) of from 1:1 to 1:20, each based on the solids, and spray-drying the aqueous dispersion mixture thus obtained to form a finely divided polymer mixture.

2. A process as claimed in claim 1, wherein the amphiphilic polymers used are polyesters having a molecular mass $M_W$ of from 4000 to 60000 where the hydrophilic units are polyethylene glycol, block copolymers of ethylene oxide and propylene oxide and/or butylene oxide having molecular masses $M_n$ of from 500 to 8000 and/or sulfo-containing monobasic or polybasic carboxylic acids and the hydrophobic units are condensation blocks of aromatic polybasic carboxylic acids, optionally in combination with aliphatic polybasic carboxylic acids, condensed with $C_2$–$C_4$-alkylene glycols and/or trihydric or more highly hydric alcohols.

3. A finely divided polymeric mixture having a particle size of from 20 μm to 3 mm, prepared by the process of claim 2, said finely divided mixture being free-flowing at room temperature, storage-stable and readily dispersible in water.

4. A process as claimed in claim 1, wherein the amphiphilic polymers used are polyesters containing units of (1) ethylene terephthalate, and (2) polyoxyethylene terephthalate of polyethylene glycols having molecular masses Mn of from 1000 to 7500 in a weight ratio of (1):(2) of from 1:1 to 1:25.

5. A finely divided polymeric mixture having a particle size of from 20 μm to 3 mm, prepared by the process of claim 4, said finely divided mixture being free-flowing at room temperature, storage-stable and readily dispersible in water.

6. A process as claimed in claim 1, wherein the amphiphilic polymers used are polyesters which are obtained by condensation of (1) carboxylic acids having at least 2 carboxyl groups, their esters, anhydrides or mixtures, with (2) at least dihydric alcohols and/or addition products of from 1 to 5 mol of at least one alkylene oxide having 2 or 3 carbon atoms with 1 mol of an at least dihydric alcohol or mixtures, and (3) water-soluble addition products of from 5 to 80 mol of at least one alkylene oxide with 1 mol of $C_8$–$C_{24}$-alcohols, $C_8$–$C_{18}$-alkylphenols or $C_8$–$C_{24}$-alkylamines in a molar ratio of (1):(2):(3) of 100:(from 25 to 2500):(from 5 to 110) at temperatures of at least 120° C. to molecular masses $M_W$ from 4000 to 50000.

7. A finely divided polymeric mixture having a particle size of from 20 μm to 3 mm, prepared by the process of claim 6, said finely divided mixture being free-flowing at room temperature, storage-stable and readily dispersible in water.

8. A process as claimed in claim 1, wherein the amphiphilic polymers used are polyesters containing blocks of (1) ester units of polyalkylene glycols having a molecular mass of from 500 to 7500 and aliphatic dicarboxylic acids and/or monohydroxycarboxylic acids, and (2) ester units of aromatic dicarboxylic acids and polyhydric alcohols and having molecular masses $M_W$ from 4000 to 25000.

9. A finely divided polymeric mixture having a particle size of from 20 μm to 3 mm, prepared by the process of claim 8, said finely divided mixture being free-flowing at room temperature, storage-stable and readily dispersible in water.

10. A process as claimed in claim 1, wherein (b) comprises polymers of monoethylenically unsaturated carboxylic acids, polyamidocarboxylates, polyestercarboxylates, polyacetalcarboxylates, graft polymers of monoethylenically unsaturated mono- and/or dicarboxylic acids on mono- and/or polysaccharides or polyalkylene oxides, polymer of citric acid, oxidized starches or mixtures thereof.

11. A finely divided polymeric mixture having a particle size of from 20 μm to 3 mm, prepared by the process of claim 10, said finely divided mixture being free-flowing at room temperature, storage-stable and readily dispersible in water.

12. A process as claimed in claim 1, wherein (b) comprises copolymers of acrylic acid and maleic acid, oligomaleic acid, polyaspartic acid, polymer of citric acid, monooxidized starches or mixtures thereof.

13. A finely divided polymeric mixture having a particle size of from 20 μm to 3 mm, prepared by the process of claim 12, said finely divided mixture being free-flowing at room temperature, storage-stable and readily dispersible in water.

14. A finely divided polymer mixture having a particle size of from 20 μm to 3 mm, prepared by the process of claim 1, said finely divided polymeric mixture being free-flowing at room temperature, storage-stable and readily dispersible in water.

15. A process for preparing finely divided mixtures of amphiphilic polymers and polycarboxylates, which comprises dispersing at least one amphiphilic polymer in an aqueous solution of a polycarboxylate, and spray-drying the aqueous dispersion thus obtained to form a finely divided polymer mixture.

16. A process as claimed in claim 15, wherein the amphiphilic polymers used are polyesters having a molecular mass $M_W$ of from 4000 to 60000 where the hydrophilic units are polyethylene glycol, block copolymers of ethylene oxide and propylene oxide and/or butylene oxide having molecular masses $M_n$ of from 500 to 8000 and/or sulfo-containing monobasic or polybasic carboxylic acids and the hydrophobic units are condensation blocks of aromatic polybasic carboxylic acids, optionally in combination with aliphatic polybasic carboxylic acids, condensed with $C_2$–$C_4$-alkylene glycols and/or trihydric or more highly hydric alcohols.

17. A process as claimed in claim 15, wherein the amphiphilic polymers used are polyesters containing units of (1) ethylene terephthalate, and (2) polyoxyethylene terephthalate of polyethylene glycols having molecular masses Mn of from 1000 to 7500 in a weight ratio of (1):(2) of from 1:1 to 1:25.

18. A process as claimed in claim 15, wherein the amphiphilic polymers used are polyesters which are obtained by condensation of (1) carboxylic acids having at least 2 carboxyl groups, their esters, anhydrides or mixtures, with (2) at least dihydric alcohols and/or addition products of from 1 to 5 mol of at least one alkylene oxide having 2 or 3 carbon atoms with 1 mol of an at least dihydric alcohol or mixtures, and (3) water-soluble addition products of from 5 to 80 mol of at least one alkylene oxide with 1 mol of $C_8$–$C_{24}$-alcohols, $C_8$–$C_{18}$-alkylphenols or $C_8$–$C_{24}$-alkylamines in a molar ratio of (1):(2):(3) of 100:(from 25 to 2500):(from 5 to 110) at temperatures of at least 120° C. to molecular masses $M_W$ from 4000 to 50000.

19. A process as claimed in claim 15, wherein the amphiphilic polymers used are polyesters containing blocks of (1) ester units of polyalkylene glycols having a molecular mass of from 500 to 7500 and aliphatic dicarboxylic acids and/or monohydroxycarboxylic acids, and (2) ester units of aromatic dicarboxylic acids and polyhydric alcohols and having molecular masses $M_W$ from 4000 to 25000.

20. A process as claimed in claim 15, wherein said polycarboxylate comprises polymers of monoethylenically unsaturated carboxylic acids, polyamidocarboxylates, polyestercarboxylates, polyacetalcarboxylates, graft polymers of monethylenically unsaturated mono- and/or dicarboxylic acids on mono- and/or polysaccharides or polyalkylene oxides, polymer of citric acid, oxidized starches or mixtures thereof.

21. A process as claimed in claim 15, wherein said polycarboxylate comprises copolymers of acrylic acid and maleic acid, oligomaleic acid, polyaspartic acid, polymer of citric acid, monooxidized starches or mixtures thereof.

22. A finely divided polymeric mixture having a particle size of from 20 µm to 3 mm, prepared by the process of claim 15, said finely divided mixture being free-flowing at room temperature, storage-stable and readily dispersible in water.

* * * * *